Nov. 12, 1968    H. WEINSTEIN    3,411,128

ELECTRICAL JOINT COMPOUND

Filed April 26, 1967

INVENTOR.
HAROLD WEINSTEIN
BY
OSTROLENK, FABER, GERB & SOFFEN
ATTORNEYS

United States Patent Office 3,411,128
Patented Nov. 12, 1968

3,411,128
ELECTRICAL JOINT COMPOUND
Harold Weinstein, Van Nuys, Calif., assignor to International Rectifier Corporation, El Segundo, Calif., a corporation of California
Filed Apr. 26, 1967, Ser. No. 633,970
5 Claims. (Cl. 339—95)

ABSTRACT OF THE DISCLOSURE

Tungsten particles carried in a silicone grease carrier are coated between two metal surfaces which are to be electrically connected. The particles are hard enough to cut through oxide coatings on the metal surfaces to be connected to assure good electrical and thermal connection between the surfaces. A metal mesh may be used to improve its ability to retain the grease under high temperature conditions. A sealing ring is captured between the surfaces to prevent outward flow of the grease under high compression forces and high temperatures.

---

This invention relates to electrical joint compounds, and more particularly relates to an electrical joint compound employing very hard metallic particles carried in a silicone grease carrier.

Electrical joint compounds are well known for use in insuring a good electrical and thermal connection between two metallic bodies which are to be clamped together in surface-to-surface relation.

In one known thermal grease, an oil carries a zinc filler. Such greases have been found to cause pitting of the surfaces connected together and the grease deteriorates at temperatures over about 100° C. Another known grease uses an aluminum filler, but again is subject to temperature limits due to deterioration of the oil carrier. Oxide fillers have also been used which again have severe temperature limits and cause pitting of the surfaces to be connected. Fluoride carriers have also been used for relatively soft metal particles where the carrier becomes very fluid at temperatures above about 100° C.

In addition to the temperature limitations and tendency to pit the surfaces connected together, all known compounds are subject to relatively high voltage drops and aging or increased voltage drop after a certain amount of duty.

In accorance with the invention, a silicone grease having good temperature charcteristics is used as a carrier for small conductive metal particles having a relatively high hardness, sufficient for penetrating an oxide film barrier that may coat the surfaces of the bodies which are to be connected.

The metal powers to be used in accordance with the invention are selected for hadness of about 6 on the MOH scale of hadness; for good electrical and thermal conductivity; good chemical resistance and good arc resistance between particles. The preferred particle material is tungsten powder having a particle size of from 1 to 50 microns, preferably about 1.5 microns. Other metals which can be satisfatorily used are molybdenum, chromium and nickel. A silicone oil is then used as a carrier for the particles, one suitable oil being Dow Corning silicone oil type DC510 having a viscosity of from 100 to 100,000 centistokes, and preferably about 500 centistokes.

The powder and oil are then mixed to a paste-like consistency, in a mixture by weight of from 9–1 to 1–1 ratio by weight of metal powder to oil; preferably in a mixture of 85 to 15 parts by weight of metal to oil.

When the conductive grease is suitably mixed, it is coated over the surfaces of two electrical bodies which are to be connected in surface-to-surface relation. These bodies may be of similar materials such as copper or aluminum, or of dissimilar materials such as copper to aluminum. The two surfaces are then clamped together by a suitable clamping structure with the grease between them to cause an intimate conductive bond between the two surfaces.

In accordance with another feature of the invention, a sealing ring can surround the surface region being connected to insure retention of the grease between the surfaces being bonded.

As a still further feature of the invention, the metal can be formed in a mesh to improve retention of the grease and simplify the application of the grease filled mesh between the surfaces being joined.

Accordingly, a primary object of this invention is to provide a novel electrical conductive grease which has a lower voltage drop and improved temperature stability.

Yet another object of this invention is to provide a novel electrically conductive grease using hard metal particles which can form a good connection between oxidized metal surfaces.

A further object of this invention is to provide seal means for retaining an electrically conductive grease in a surface bond between two bodies.

Another object of this invention is to provide a novel metal mesh impregnated with silicone oil for improving the surface-to-surface connection of two conductive bodies.

These and other objects of the invention will become apparent in the following description when taken in connection with the drawings in which.

In accordance with the invention, hard metal particles are mixed with a silicone oil to form a paste-like grease that can be applied to the surfaces of two bodies to be joined. The metal particles are metals having a MOH scale of hadness of about 6 and include tungsten, molybdenum, chromium and nickel as preferred materials. The particle size of the materials range from 1 to 50 microns and any mixture of particle size in this range is suitable. Preferably, a preponderance of about 1.5 micron particles should be present.

The oil used as a carrier can be any desired silicone oil such as Dow Corning DC510 having a viscosity of from 100 to 10,000 centistokes.

The metal and oil particles are then mixed in a ratio by weight of from 9–1 to 1–1 to a paste-like consistency.

*Example I*

A satisfactory blend was formed of tungsten powder having the following particle size distribution.

| Micron size range: | Percent of size in sample |
|---|---|
| 0–1 | 31.5 |
| 1–2 | 39.0 |
| 2–3 | 21.4 |
| 3–4 | 6.2 |
| 4–5 | 1.9 |

This powder was then mixed with 100 centistoke Dow Corning DC510 silicone oil in a ratio of 80 parts by weight of tungsten powder to 20 parts by weight of oil. The mixture was then applied between the surfaces of two copper conductors having diameters of 1.25 inches and electrical current of 250 amperes, full cycle average, was passed through the intersurface. As the clamping force increased from 750 to 2250 pounds, the voltage drop across the interface dropped from 5.5 to 2 millivolts peak.

*Example II*

The grease of Example I was applied to conductors having diameters of 1.75 inches and the procedure was repeated. The millivolt drop now decreased from 9 to 4 millivolts as clamping force increased from 750 to 2250 pounds.

*Example III*

A second batch was then prepared, similar to the first batch, but using a 500 centistoke DC510 Dow Corning silicone oil and a mixture of about 83 to 17 parts by weight of metal to oil. Clamping 1.25 inch diameter samples with this mixture gave forward voltage drops decreasing from 5.5 to 2 millivolts for forces increasing from 750 to 2250 pounds. After 24 hours of sustained current, the millivolt drops were observed to decrease by about 10%.

*Example IV*

The procedure of Example III was repeated for 1.75 inch diameter conductive bodies and the forward millivolt drop decreased from 7 to 3.5 for forces increasing from 750 to 2250 pounds.

It was found that the results of the above examples were highly repeatable, gave a decreased forward voltage drop than other conductive greases which are available, and was stable at relatively high temperatures. Moreover, there was little pitting observed in the surfaces being connected through the grease.

Figure 1:
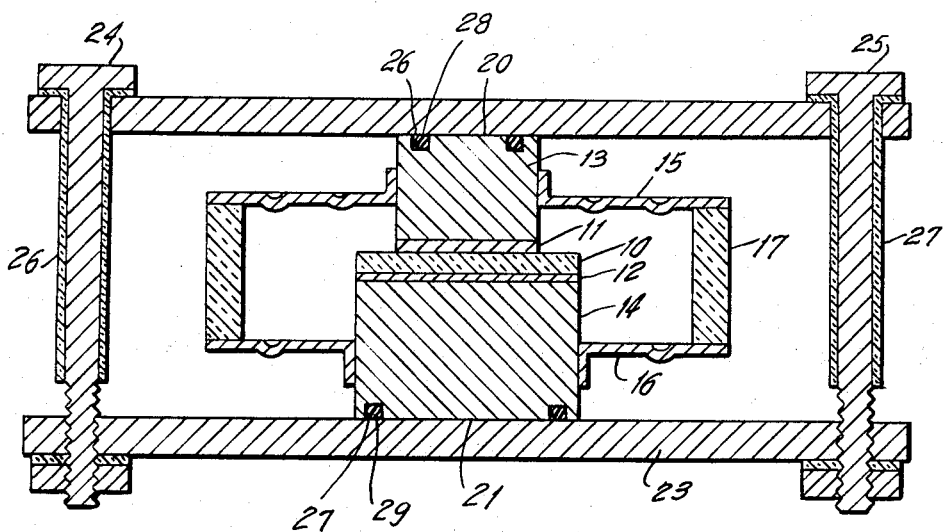
FIGURE 1 is a cross-sectional view of a compression bonded rectifier using an electrically conductive grease and sealing ring.

FIGURE 1 shows a compression bonded rectifier assembly that could use a grease of the type of the present invention. Referring to FIGURE 1, a subassembly of a silicone wafer 10 having a junction therein is secured between molybdenum expansion plaes 11 and 12. A pair of heavy copper conductors 13 and 14 are connected to plates 11 and 12, respectively, and receive flexible headers 15 and 16, respectively. The outer peripheries of headers 15 and 16 are connected to the ends of cylindrical insulator 17.

This arrangement then provides flat and parallel surfaces 20 and 21 of conductors 13 and 14, respectively, to be connected to a suitable clamping structure, with the wafer 10 hermetically sealed by headers 15 and 16 and insulation ring 17.

One suitable clamping structure includes conductive plates 22 and 23 which are clamped toward one another by bolts 24 and 25 which are insulated from plate 22 by insulation sheaths 26 and 27, respectively.

The grease of the invention is then applied on the surfaces 20 and 21 to insure a good thermal and electrical connection of surfaces 20 and 21 to the opposing surfaces of plates 22 and 23. In accordance with a further feature of the invention, surfaces 20 and 21 may have annular grooves 26 and 27 therein which receive flexible gaskets 28 and 29, respectively, which encircle the major surface area of surfaces 20 and 21, respectively. This prevents the squeezing out of the conductive grease with pressure, or due to decreased viscosity with elevated temperature, from the surfaces 20 and 21, and also prevents access of air to the grease.

Figure 2:
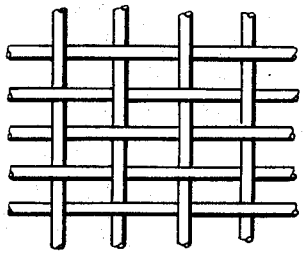
FIGURE 2 shows a mesh which could be used in accordance with the invention.

As a further feature of the invention, metal materials could be formed in a tight woven mesh, as shown in FIGURE 2, and the tungsten-silicone oil impregnates the mesh. The use of the mesh may be more convenient in use than the application of the grease, as from a tube or the like.

Although there has been described a preferred embodiment of this novel invention, many variations and modifications will now be apparent to those skilled in the art. Therefore, this invention is to be limited, not by the specific disclosure herein, but only by the appending claims.

The embodiments of the invention in which an exclusive privilege or property is claimed are defined as follows:

1. In combination; a first conductive body, a second conductive body, an electrically conductive grease and clamping means for clamping said conductive bodies toward one another; said first and second bodies having first and second coplanar surfaces adjacent one another and connected to one another; said electrically conductive grease interposed between said first and second surfaces; the improvement which comprises a sealing ring extending around and enclosing one of the surfaces and in contact with said other surface, thereby to prevent flow of said grease outwardly from between said first and second surfaces and to prevent entrance of air into said first and second surfaces.

2. The combination as set forth in claim 1 wherein said first surface has a ring shaped groove therein; said sealing ring disposed in said ring shaped groove.

3. In combination, a first conductive body, a second conductive body, a conductive mesh, and clamping means for clamping said first and second conductive bodies toward one another; said first and second bodies having first and second coplanar surfaces adjacent one another and connected to one another; said conductive mesh interposed between said first and second surfaces, and a silicone oil-metallic particle mixture permeating said conductive mesh.

4. The combination as set forth in claim 3 wherein the particles of said mixture are of material having an MOH scale hardness of about 6.

5. The combination as set forth in claim 3 wherein said conductive mesh is of a material selected from the group comprised of tungsten, molybdenum, chromium and nickel.

References Cited

UNITED STATES PATENTS

| | | | |
|---|---|---|---|
| 1,957,940 | 5/1934 | Conradty | 204—286 |
| 3,125,649 | 3/1964 | St. Cyr | 200—82 |
| 3,226,608 | 12/1965 | Coffin | 317—234 |

FOREIGN PATENTS

| | | |
|---|---|---|
| 1,065,052 | 9/1959 | Germany. |

MARVIN A. CHAMPION, *Primary Examiner.*

JOSEPH H. McGLYNN, *Assistant Examiner.*